United States Patent [19]

Legros et al.

[11] 4,211,368

[45] Jul. 8, 1980

[54] DEVICE FOR AERATING AND CHEMICALLY ACTIVATING SHOWER WATER

[76] Inventors: Francis R. Legros, 64, rue Compans; Alain L. Tourman, 60, rue de Babylone, both of Paris, France

[21] Appl. No.: 897,905

[22] Filed: Apr. 19, 1978

Related U.S. Application Data

[63] Continuation-in-part of Ser. No. 694,375, Jun. 9, 1976, abandoned.

[30] Foreign Application Priority Data

Jun. 9, 1975 [FR] France .................. 75 17860

[51] Int. Cl.² ............................................. B05B 7/24
[52] U.S. Cl. ...................................... 239/315; 239/316; 239/428.5

[58] Field of Search ............... 239/310, 314, 315, 316, 239/318, 428.5, 311; 4/222-233; 222/193, 630

[56] References Cited

U.S. PATENT DOCUMENTS

| | | | |
|---|---|---|---|
| 1,973,319 | 9/1934 | Nelson | 239/316 X |
| 2,935,265 | 5/1960 | Richter | 239/428.5 X |
| 3,140,829 | 7/1964 | Rose | 239/318 |
| 3,504,702 | 4/1970 | Collins et al. | 239/318 X |

Primary Examiner—Joseph E. Valenza
Assistant Examiner—Andres Kashnikow
Attorney, Agent, or Firm—John T. Roberts

[57] ABSTRACT

The invention relates to devices which both aerate and chemically alter water delivered by irrigator apparatus such as shower heads. The device is attached to the shower head and includes a first mixing chamber for mixing water and air and a second mixing chamber for mixing the aerated water with a chemical.

1 Claim, 2 Drawing Figures

DEVICE FOR AERATING AND CHEMICALLY ACTIVATING SHOWER WATER

CROSS-REFERENCE TO RELATED APPLICATION

This invention is disclosed in part in my co-pending application, Ser. No. 694,375, filed on June 9, 1976, now abandoned the priority of which is claimed for the common subject matter.

FIELD OF INVENTION

Medical, cosmetic, and aromatic baths are widely used at present. This invention allows the showers which are today in homes, through inexpensive attachment, to give a similar treatment.

DESCRIPTION OF PRIOR ART

The most pertinent prior art known to applicants are the following four U.S. Pat Nos. 3,140,829 to B. J. Rose entitled Detergent Dispenser; 3,504,702 to R. D. Collins et al entitled Fluid Mixing Device; 2,935,265 to H. M. Richter entitled Jet-Aerator Spray Shower-Head; and No. 1,973,319 to S. Nelson entitled Soap and Crystal Dispenser.

Richter discloses a jet aerator spray shower head of rather complex design. There is no disclosure of suggestion that this may be used in combination with a mixing device to chemically alter the nature of the shower waters.

Collins et al show a fluid mixing device which is not shown to be useful with an aerator and indeed apparently would not find utility in combination with an aerator.

Nelson discloses a device in which the jets coming from a shower nozzle are forced to pass entirely through what appears to be a solid cake of soap. The water is not aerated and the device if it does work would necessarily cause a rapid erosion of the soap which is at variance with the present construction.

Rose shows a combined aerator and a mixer. It differs substantially, however, in that the mixer is for a liquid detergent and is off-set to one side. The water in the Rose dispenser never contacts the cake of active substance which in applicants' design causes the turbulence and mixing of the emitted water.

In addition, we are aware of shower heads with removable screens to introduce a dissolvable product. Granulated material passes altogether too rapidly out of the device and ungranulated material clogs the exit apertures.

Additional art of interest is:

U.S. Pat. No. 3,018,969 to Gentry entitled Dual Purpose Shower Head Assembly; U.S. Pat. No. 3,766,576 to Ancel entitled Lavatory Sanitation Bodies; U.S. Pat. No. 2,975,980 to Seibert et al entitled Shower Heads; U.S. Pat. No. 3,944,140 to Caton et al entitled Shower Head; and U.S. Pat. No. 3,576,760 to Gould et al entitled Water Soluble Entrapping.

STRUCTURE OF DISCLOSED EMBODIMENT

Figure 1:
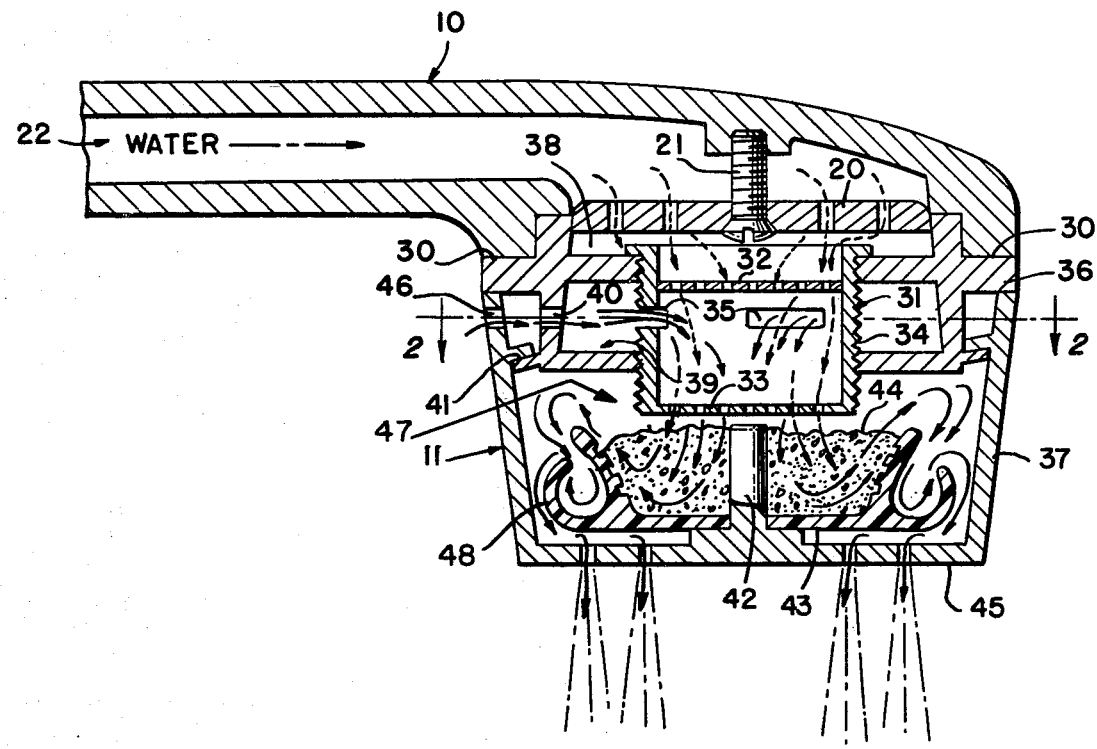
FIG. 1 is a side cross-section of the device attached to a shower head.
Figure 2:
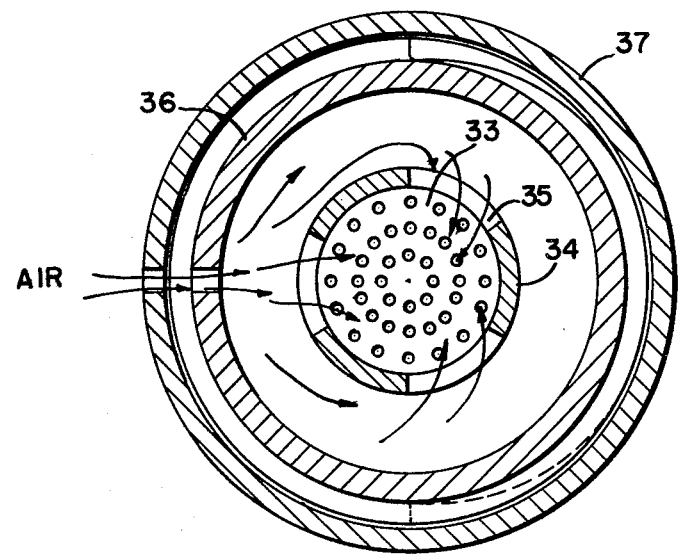
FIG. 2 is a section taken on lines 2—2 of FIG. 1.

FIG. 1 discloses a shower head 10 to which the device 11 is hermetically attached. Shower head 10 includes screen 20 retained by screw 21 at the end of water channel 22.

The device 11 is hermetically sealed along joints 30 by threads or other means not shown to shower head 10. Immediately below screen 20 is hydric aerator 31 which has a perforated upper screen 32 and perforated lower screen 33 defining a circular mixing cartridge there between. Aerator 31 also has imperforable side walls 34 which contain spaced apertures 35.

The device 11 comprises an upper body 36 and a lower body 37 which are detactably connected as will be explained below.

Upper body 36 is, as stated above, connected to shower head 10. It is also connected to aerator 31 by any convenient means such as the screw threads shown. Upper body 31 also has a horizontal internal imperforable flange 38 in sealing contact with the upper edge of aerator 31. Below that is air chamber 39 communicating between air aperture 40 and the apaced aperture 35 of aerator 31.

The lower device or magazine 37 is attached to upper device 36 through suitable means such as twist lock threads 41. It carries a spindle 42 on which rests holder 43 in which is placed the chemical substance 44. The lower wall 45 of 37 is apertured. An air inlet aperture 46 communicating with aperture 40 is also provided.

The holder 43 contains small blades 48 which further mix the water by causing turbulence, eddies and whirls. The holder 43 further contains grooves 47 which aid in holding chemical 44 therein.

The particular formulation of the chemical substance is not a part of the present invention. It will comprise an excipient or carrier and an active substance. By way of example, a hot thalassotherapic shower may be obtained by mixing, by weight, five parts of unrefined sea salt with one part cetyl-stearylic alcohol at 30 moles of ethylene oxide.

Mode of Operation

Water under pressure flows through channel 22 and leaves shower head 10 through screen 20. It is then entirely directed through the upper screen 32 of aerator 31. As is well known, the reduced cross-section causes both increased velocity and reduced pressure. Air is drawn in through apertures 46 and 40 into chamber 39 and lastly through aperture 35 to aerator 31 to mix with the water.

The aerated water exits aerator 31 through screen 33 in the form of fine spray, onto chemical substance 44. After mixing with some of the substance, the water exits the device through the apertures in the lower wall 45.

The lower device 37 may be detachably disconnected to replenish chemical 44 or to replace holder 43 with a freshly charged one.

A proper selection of chemical formulation for shower temperature and pressure allows a fixed small amount of the chemical to be mixed or leached out by the water, thus overcoming the difficulties of prior devices.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. A device for physically aerating and chemically activating the waters flowing from a shower having a screen which comprises:
   (a) a device including an aerator which fits in fluid tight relationship over the screen of the shower;
   (b) said device having an aperture at its periphery to draw air into the aerator;
   (c) said aerator having a cylindrical mixing cartridge axially aligned;
   (d) said mixing cartridge receiving water from the shower screen at its inlet end;
   (e) said mixing cartridge having circumferential apertures to introduce the air to the cartridge;
   (f) said mixing cartridge having a screen over its exit end to direct a plurality of fine jets of aerated water downwardly;
   (g) magazine attached to said aerator;
   (h) said magazine of generally circular shape and attached to said aerator to receive the water jets leaving the screen of the aerator;
   (i) said magazine having a screen below the exit screen of the aerator;
   (j) said magazine screen directing the water out of the aerator and magazine;
   (k) a holder for holding solid hydrofusable chemical for chemically altering the waters flowing from the aerator to the magazine; and
   (l) said holder suspended below the aerator to receive the jets of water leaving the screen of the aerator, whereby a stream of water leaving a shower is simultaneously aerated and chemically activated.

* * * * *